US009489773B2

(12) United States Patent
Damola (10) Patent No.: US 9,489,773 B2
(45) Date of Patent: Nov. 8, 2016

(54) CACHING SUPPORT FOR VISUAL SEARCH AND AUGMENTED REALITY IN MOBILE NETWORKS

(75) Inventor: Ayodele Damola, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 144 days.

(21) Appl. No.: 14/127,653

(22) PCT Filed: Jun. 21, 2011

(86) PCT No.: PCT/SE2011/050814
§ 371 (c)(1),
(2), (4) Date: Dec. 19, 2013

(87) PCT Pub. No.: WO2012/177194
PCT Pub. Date: Dec. 27, 2012

(65) Prior Publication Data
US 2014/0111545 A1    Apr. 24, 2014

(51) Int. Cl.
*G06T 19/00* (2011.01)
*H04W 4/18* (2009.01)
*H04L 29/08* (2006.01)
*H04N 21/222* (2011.01)
*H04N 21/231* (2011.01)
(Continued)

(52) U.S. Cl.
CPC .......... *G06T 19/006* (2013.01); *G06F 17/3087* (2013.01); *H04L 67/2842* (2013.01); *H04N 21/2223* (2013.01); *H04N 21/23106* (2013.01); *H04N 21/41407* (2013.01); *H04N 21/4722* (2013.01); *H04N 21/6131* (2013.01); *H04W 4/18* (2013.01); *H04L 67/38* (2013.01)

(58) Field of Classification Search
CPC ................. H04L 29/08801; G06T 19/006
See application file for complete search history.

(56) References Cited

U.S. PATENT DOCUMENTS

2007/0162942 A1   7/2007  Hamynen et al.
2009/0061901 A1   3/2009  Arrasvuori et al.
(Continued)

FOREIGN PATENT DOCUMENTS

CN    101101505 A    1/2008
CN    101167335 A    4/2008
(Continued)

OTHER PUBLICATIONS

European Supplementary Search Report and Opinion, dated Feb. 27, 2015, in connection with European Patent Application No. 11868138.6-1905, all pages.
(Continued)

*Primary Examiner* — Jeffery A Brier
(74) *Attorney, Agent, or Firm* — Leffler Intellectual Property Law, PLLC (57) ABSTRACT

A visual search and augmented reality are performed in a communication system that includes an Internet network attached to a mobile network. Data related to objects that are geographically related to at least one intermediate node is stored in at least one intermediate node in the mobile network. This involves transmitting a request for metadata from a user equipment in the mobile network towards the Internet network via the at least one intermediate node. The request comprises object recognition data related to an object geographically related to the at least one intermediate node. The request is de-tunnelled and intercepted in an intermediate node of the at least one intermediate node.

14 Claims, 7 Drawing Sheets

(51) Int. Cl.
  H04N 21/414   (2011.01)
  H04N 21/4722  (2011.01)
  H04N 21/61    (2011.01)
  G06F 17/30    (2006.01)
  H04L 29/06    (2006.01)

(56) References Cited

U.S. PATENT DOCUMENTS

| | | | |
|---|---|---|---|
| 2009/0083275 | A1 | 3/2009 | Jacob et al. |
| 2010/0034089 | A1 | 2/2010 | Kovvali et al. |
| 2010/0257252 | A1 | 10/2010 | Dougherty et al. |
| 2010/0260426 | A1 | 10/2010 | Huang et al. |
| 2011/0034176 | A1* | 2/2011 | Lord ............... G06F 17/30244 455/450 |
| 2011/0212717 | A1* | 9/2011 | Rhoads ............ G06F 17/30241 455/420 |
| 2012/0300089 | A1* | 11/2012 | Sbaiz ............... H04N 1/00323 348/222.1 |

FOREIGN PATENT DOCUMENTS

| | | |
|---|---|---|
| CN | 101243392 A | 8/2008 |
| CN | 101842788 A | 9/2010 |
| EP | 0 853 287 A2 | 7/1998 |
| WO | 2007036842 A2 | 4/2007 |
| WO | 2010/075155 A2 | 7/2012 |

OTHER PUBLICATIONS

Pot International Search Report, mailed Mar. 14, 2012, in connection with International Application No. PCT/SE2011/050814, all pages.

Zhou, L et al. "Effect of TCP/LLC protocol interaction in GPRS networks", presented at Computer Communications, May 29, 2001, pp. 501-506; abstract; p. 502, lines 19-23.

Mochalski, K. et al. "White paper Deep Packet Inspection", Ipoque, Leipzig, Germany, 2009. Retrieved from the internet: http://www.ipoque.com/sites/default/files, mediafiles/documents/white-paper-deep-packet-inspection.pdf; p. 2, lines 4-7.

Balakrishnan, H. et al. "Improving reliable transport and handoff performance in cellular wireless networks", Wireless Networks, Dec. 1, 1995, Springer Netherlands, ISSN: 1022-0038, pp. 469-481, vol. 1, Issue 4, Retrieved from the internet: http://dx.doi.org/10.1007/BF01985757; abstract, section 3.1.1.

Takacs, G. et al. "Outdoors Augmented Reality on Mobile Phone using loxel-based visual feature organization" in Proceedings of 1st ACM International Conference on Multimedia Information Retrieval, Vancouver, Canada, Oct. 2008, pp. 427-434, ISBN: 978-1-60558-312-9.

Tsai, S.S. et al. "Rate-efficient, Real-tome CD Cover Recognition on a Camera-phone" in Proceedings of 16th ACM International Conference on Multimedia, Vancouver, Canada, Oct. 2008, pp. 1023-1024, ISBN: 978-1-60558-303-7.

Fiscler, M. et al. "Random sample consensus: a paradigm for model fitting with applications to image analysis and automated cartography" Communications of ACM, 1981, vol. 24, No. 1, pp. 381-395.

Tsai, S. et al. "Fast Geometric Re-Ranking for Image-based Retrieval" 2010 IEEE ICIP, Sep. 26-29, 2010, pp. 1029-1032, ISSN: 1522-4880, ISBN: 978-1-4244-7992-4.

PCT Written Opinion of the International Searching Authority, mailed Mar. 14, 2012, in connection with International Application No. PCT/SE2011/050814, all pages.

English translation of Chinese Office Action issued May 19, 2016 in connection with Chinese Application No. 201180071813.4, 12 pages.

English translation of Chinese Search Report issued May 11, 2016 in connection with Chinese Application No. 201180071813.4, 3 pages.

* cited by examiner

Prior Art

CACHING SUPPORT FOR VISUAL SEARCH AND AUGMENTED REALITY IN MOBILE NETWORKS

TECHNICAL FIELD

The present invention generally relates to systems and methods and, more particularly, to mechanism and techniques for enabling visual search and augmented reality in a communication system.

BACKGROUND

Visual search is a concept where by using a camera (e.g. in a mobile phone) an image of a physical object is captured and recognized by computer algorithms and useful information is presented back to the user about the physical object.

The aim of visual search is primarily to identify the physical object and thereby present the user with some information. This information is called metadata, and it could be of various formats e.g. video files, audio files, Web pages, images animation files etc.

When the input data to an algorithm is too large to be processed and it is suspected to be notoriously redundant (much data, but not much information) then the input data will be transformed into a reduced representation set of features (also named features vector). Transforming the input data into the set of features is called feature extraction. If the features extracted are carefully chosen it is expected that the features set will extract the relevant information from the input data in order to perform the desired task using this reduced representation instead of the full size input.

Most current visual search systems adopt the feature based image matching approach [see e.g. G. Takacs et al "outdoors augmented reality on mobile phone using loxel-based visual feature organization" in ACM International Conference on Multimedia Information Retrieval, Vancouver, Canada, October 2008]. By representing images or objects using sets of local features, recognition can be achieved by matching features between the query image and candidate database image. Fast large-scale image matching is enabled using a Vocabulary Tree (VT). Features are extracted from the database of images and a hierarchical k-means clustering algorithm is applied to all of these features to generate the VT. Descriptors of the query image are also classified through the VT and a histogram of the node visits on the tree nodes is generated.

Candidate images are then sorted according to the similarity of the candidate database image histogram and a query image histogram Geometric Verification (GV) is applied after feature matching [see S. S. Tsai, D. Chen, J Singh, and B. Girod, "Rate-efficient, real-timer CD cover recognition on a camera-phone" in ACM international Conference on Multimedia, Vancouver, Canada, October 2008] to eliminate false feature matches. In this process, features of the query object are matched with features of the database objects using nearest descriptor or the ratio test. Then, a geometric transformation of the location of the features in the query object and the locations of the features in the database object is estimated using RANdom SAmple Consensus (RANSAC) algorithm [see M. Fiscler and R. Bolles, "Random sample consensus: a paradigm for model fitting with applications to image analysis and automated cryptography" Communications of ACM, vol. 24, no. 1, pp. 381-395, 1981].

Image capture and feature manipulations are proposed to be performed in the mobile terminal, while VT and GV are performed on a server in the Internet.

Augmented reality (AR) is an upcoming paradigm of presenting metadata of physical objects as an overlay over the image or video of a physical object in real time. Special applications called augmented reality browsers (AR browsers) are used in terminals e.g. mobile phones and these are gaining popularity. The AR browsers perform two main functions; visual search initiation and overlay display of metadata on the end user terminal display. The AR server incorporates elements of visual search and of an overlay object server. The visual search component performs the matching of an image to the dataset and the file server performs the function of sending the corresponding overlay data to the AR browser for displaying to the end user. It should be noted that the overlay data could range from simple text to a complex webpage containing text, audio and video components. Also it may be possible for the end user to further interact with the overlay data displayed e.g. start/stop video, scroll text, enlarge image etc. Overlay data is also called metadata of the physical object and this is the term that will be used in this document. Businesses could take advantage of AR in a multitude of ways, such as Personalized shopping: Walking around stores made relevant with the ability to opt in personalization and targeting. Here information of potential customers can be delivered by scanning stores, streets or shelves for discounted or personally relevant products.

Location layers: Blended guides to new places, tourism, enhanced traveling or themed space.

Blended branding: The equivalent of virtual poster ads.

In all case there is an entity which uses Augmented Reality AR to deliver a service or enhanced experience to an end user. The end user is interacting with a physical object of the entity. This entity will be called the service provider (SP) in this document.

Figure 1:
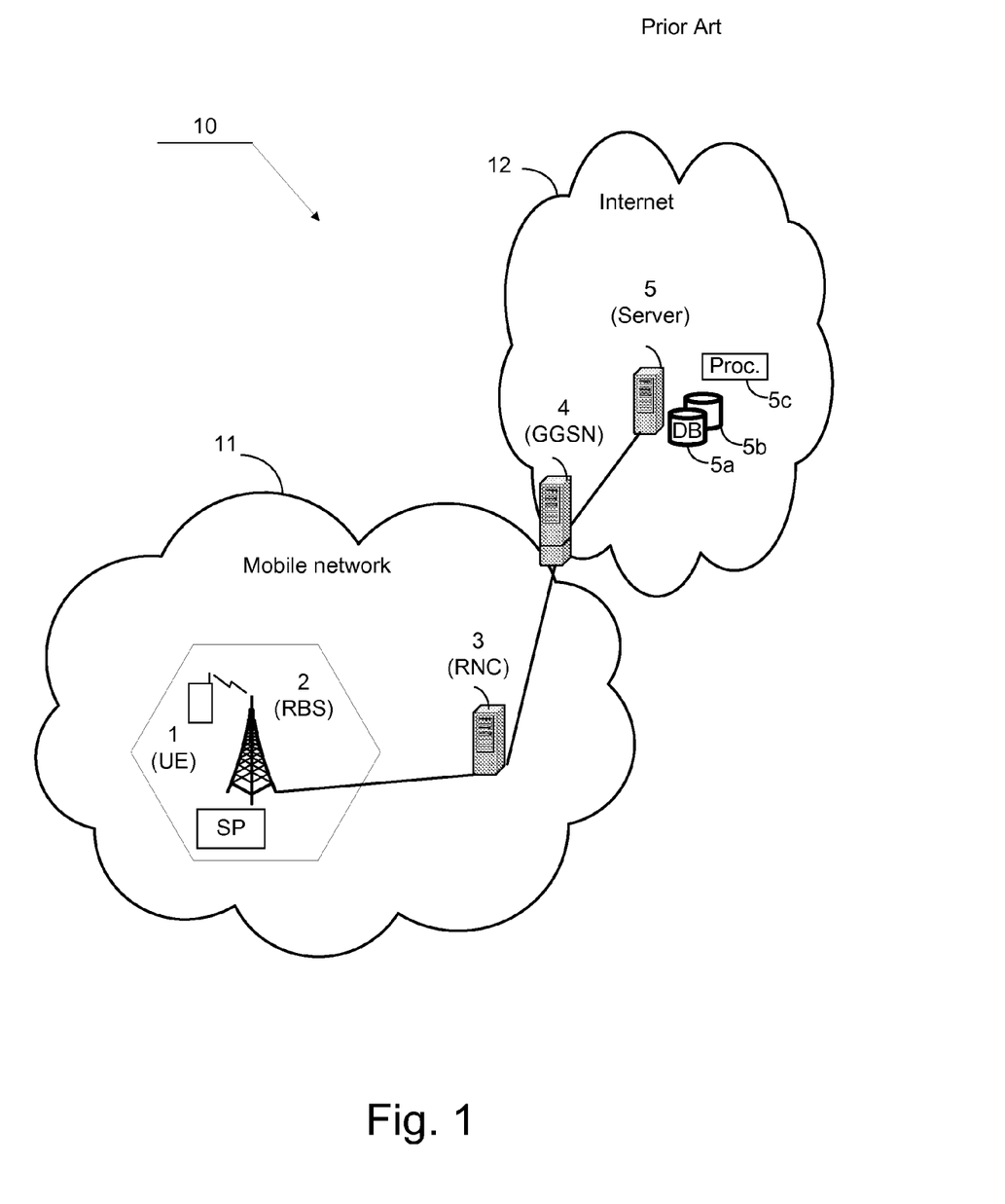
FIG. 1 is part of the prior art and discloses a block schematic illustration of a server hosting metadata in an Internet network and a user equipment in a mobile network that requests metadata.

FIG. 1 belongs to prior art and discloses a system comprising an Internet network 12 attached to a mobile network 11. A mobile phone 1 within a cell area of a Radio Base Station RBS 2 is able to communicate via intermediate nodes 2, 3 and 4 with a Server 5 in the Internet network. The intermediate nodes in the prior art example is the RBS 2, a Radio Network Controller RNC 3 and a Gateway GPRS Support Node GGSN 4. The server 5 comprises a first cache (i.e. storage) 5a of images of features, a second cache 5b of metadata, and a processor unit 5c. The Radio Base Stations 2 is attached to a Service provider SP. The service provider in this example is library; The Service Provider comprises different objects of which photos can be captured by a camera, for example photos of books. In this prior art example an image of a physical item is captured by a camera of the mobile phone. The image is then forwarded to the server 5 with a request for metadata related to the image. After a successful matching between image and cached features performed in the server by the processor, metadata is found and sent from the server 5 to the mobile phone 1 and presented on the phone for example as augmented information.

Visual search for augmented reality will cause a shift in the direction of content flow in operator networks. Today the content usually flows (as in a download scenario) from the internet via the access network to the terminal. With visual search, the flow of content will be reversed; from the terminal to the internet via the operator's network.

A new traffic flow is hereby introduced on top of the existing one; upload of images and the return of the matched data (important to note is that these flows could be delay sensitive). Hence the new traffic flows adds extra burden to the network. In this light, the operators would like (a) To control the traffic flow with aim of reducing network utilization (b) Monetize this new traffic flow With the current mobile network architecture there is no means for the operator to perform either (a) or (b) for augmented reality applications and this invention aims to propose a solution for this problem.

Another major problem with existing visual search solutions is that they usually execute the visual search algorithms in the Internet. A visual search system require that the image of feature is sent to the Internet, if there is transmission issue in the Internet the reply will be delayed and this would adversely affect the Quality of Services QoE of using visual search systems and the user will be forced to wait for a long time for the result and might eventually abandon the service.

SUMMARY

An aim of the invention is to overcome above identified limitations of the prior art. The invention focuses on performing visual search procedures inside the operator's network.

The basic concept of the invention is a system which allows the operator to control the flow of visual search and augmented reality traffic by using caches in the operator network. Caches in traffic aggregation points (also called intermediate nodes) are hereby populated with metadata of physical objects geographically related to the traffic aggregation points. The solution further exploits the proximity relationship between physical objects which are inside the radio cell layout of the Radio Access Network RAN and the traffic aggregation points of the RAN which have caches. The caches contain object recognition data for making a match with a request from a user, and metadata that is returned to the requesting user if the matching was successful.

The solution in one exemplified embodiment is a method for performing visual search and augmented reality in a communication system comprising an Internet network attached to a mobile network. At least one intermediate node(s) (also called Mobile Network Operator node) in the mobile network is populated (i.e. stored) with data corresponding to objects that are geographically related to the at least one intermediate node(s). A request for metadata is transmitted from a user equipment in the mobile network towards the Internet network via the at least one intermediate node(s). The request comprises object recognition data related to a physical object related to the at least one intermediate node(s). The request is intercepted by an intermediate node of the at least one intermediate node(s).

The solution in another exemplified embodiment is a Mobile Network Operator node in a communication system. The node is configured to perform visual search and augmented reality. The node comprises means to receive data for populating (i.e. storing) the node with data corresponding to objects that are geographically related to the node and means for de-tunnelling and intercepting a received request for metadata related to a physical object geographically related to the node.

The solution in yet another exemplified is a computer program loadable into a processor of a communication system, wherein the computer program comprises code adapted to perform the method for performing visual search and augmented reality.

An object of the invention is to control traffic flow with the aim of reducing network utilization and improving QoE of using AR applications.

Some advantages of the invention are as follows:

Traffic reduction: the operator is able to reduce traffic on a link between the intermediate node and the core as well as over the peering. This is because all the data is now sent between the terminal and intermediate node.

Hosting: the operator is able to generate new revenue from service providers who wish to offer visual search and augmented reality services to their customers. The responsiveness and hence Quality of Experience for the end user that the system provides is the main advantage over Internet based solutions.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 2:
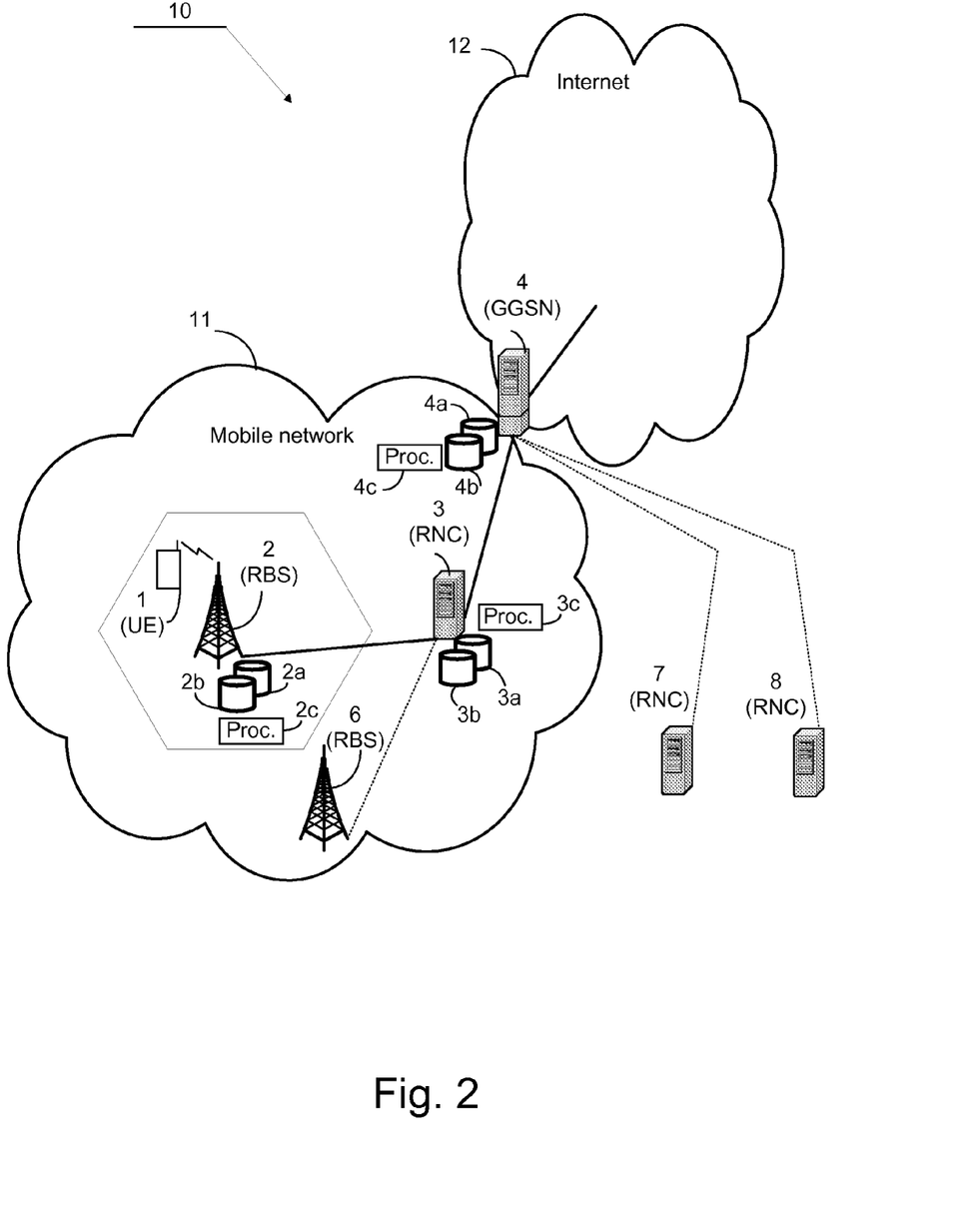
FIG. 2 discloses a block schematic illustration of an Internet network attached to a mobile network and a user equipment requesting metadata. The request is sent via intermediate nodes that comprise caches.

FIG. 2 discloses a system comprising an Internet network 12 attached to a mobile network 11. A Gateway GPRS Support Node GGSN 4 provides network access to external hosts in the Internet network wishing to communicate with mobile subscribers in the mobile network. Beyond the GGSN, other nodes like Radio Network Controllers RNCs and Radio Base Stations are shown in the figure. The nodes, so called intermediate nodes, i.e. the GGSN, the RNS and the RBS in this example, act as aggregators for traffic from lower laying nodes, e.g. the RNC aggregates traffic from a set of RBS nodes, a GGSN aggregates traffic from a set of RNC nodes etc. The GGSN 4 in FIG. 2 is attached to Radio Network Controllers RNCs 3,7,8 in the mobile network. The Radio Network Controller 3 is attached to Radio Base Stations RBSs 2,6. User Equipment 1 is located within a cell area of the Radio Base Station RBS 2. The intermediate nodes are equipped with caches (i.e. storage units) and processor units. The RBS 2 comprises a first cache 2*a* that according to the invention is populated with data (also called object recognition data) such as images of features of physical objects located within the cell area covered by RBS 2, a second cache 2*b* that according to the invention is populated with data such as metadata related to the physical objects located within the cell area covered by RBS 2 of which images of features are cached in 2*a*, and a processor unit 2*c*. For the purpose of making the general principle of the invention clearer, the RBS 2 is referred to in this example as an intermediate node comprising caches. It is to be noted however that in e.g. a 3G (High Speed Packet Access HSPA) system caches are to be located in RNC and in GGSN, while in a 4G (Long Term Evolution LTE) system the caches are to be located in eNodeB (i.e. base station) and in GGSN. The Radio Network Controller 3 in this example comprises in the same way a first cache 3*a* of images of features of physical objects located within all the cell areas handled by RNC 3 via the RBSs, a second cache 3*b* of metadata related to the physical objects located within the cell areas belonging to RBSs that are handled by RNC 3 and cached in 3*a*, and a processor unit 3*c*. Also the GGSN 4 comprises in the same way a first cache 4*a* of images of features of physical objects located within all the cell areas handled via RBSs by the GGSN 4, a second cache 4*b* of metadata related to physical objects located within the cell areas belonging to RBSs that are handled by GGSN 4 and cached in 4*a*, and a processor unit 4*c*.

As an example of object recognition data that has been cached in a first cache could be an image of the Ericsson Globe arena in Stockholm whiles the belonging metadata that has been cached in a corresponding second cache could be events possible to see in the arena during the coming two weeks. It should be noted that the cached data does not necessarily need to be stored in two different storage nodes 2*a*-2*b*;3*a*-3*b*;4*a*-4*b*, instead a single entity could be used. The populating of the caches can be performed for example by transmitting selected data to each one of the caches in the lower laying intermediate nodes, e.g. 3,7,8,2,6 from the server 5 that was seen in FIG. 1. Alternatively the population can be performed by "manually" filling each cache with content according to operator policy via an interface. The population is done according to relevance of the data, i.e. at GGSN level object recognition data and metadata of real world objects across all cells (e.g. "country") are cached, at RNC level object recognition data and metadata of real world objects across several cells (e.g. "city") are cached and at RBS level object recognition data and metadata of real world objects in the RBS cell (e.g. "a few streets") are cached. The population will later in the description part of this application be further discussed together with FIG. 5.

A method according to the invention will now be discussed, first in a comprehensive way by aid of a flowchart disclosed in FIG. 3 and then later in the description part of this application in more detail by aid of a signal sequence diagram disclosed in FIG. 6.

Figure 3:
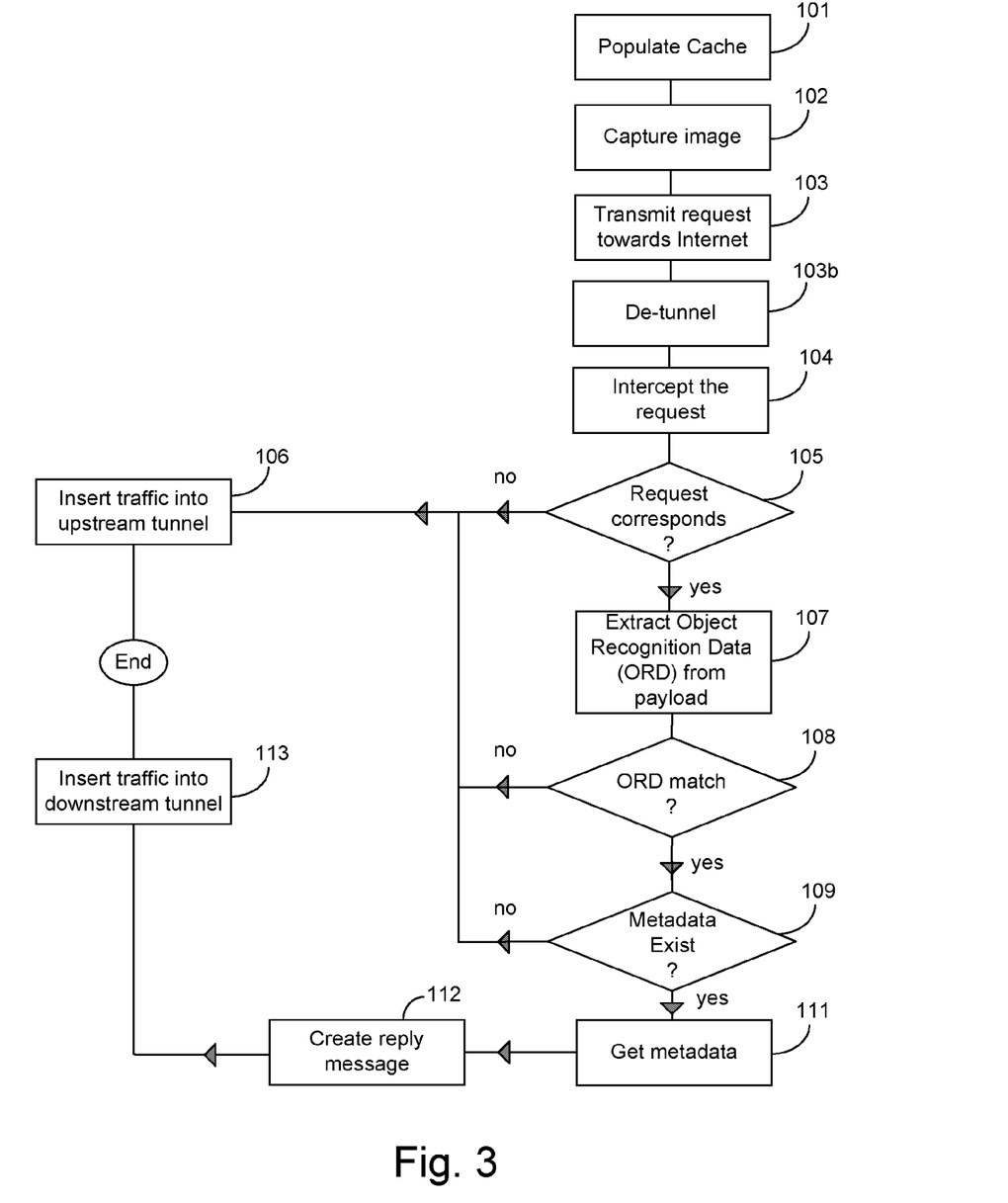
FIG. 3 discloses a flow chart illustrating steps of the invention.

FIG. 3 discloses a flowchart that gives an overview of a method according to the invention. The flowchart is to be read together with the earlier shown FIG. 2. The flowchart comprises the following step:

Caches 2*a*-*b*, 3*a*-*b*, 4*a*-*b* in the Mobile network 11 are populated with object recognition data related to physical objects within cell areas handled by each intermediate node respectively, and further populated with metadata corresponding to the cached object recognition data related to the physical objects. A block 101 discloses this step in FIG. 3.

An image of a physical object is captured by a user e.g. by using a camera of the mobile phone 1 (User Equipment). A block 102 discloses this step in FIG. 3.

A request for metadata related to the captured image, is sent from the user equipment 1 towards the Internet 12. A feature of the image or the image itself might hereby constitute the object recognition data sent in the request. In this example the request comprises a feature of an image. A block 103 discloses this step in FIG. 3.

The traffic comprising the request is de-tunneled to the first node that is to be passed i.e. the RBS 2. A block 103*b* discloses this step in FIG. 3.

The first node that is to be passed i.e. the cache apparatus 2*a*-2*c* of RBS 2 in this example intercepts the request by performing a traffic break-out. A traffic break-out and classifier function in the first node is configured to do the break-out. In this generic example the RBS comprises caches, to be noted is, as already mentioned, that in case the system is a 3G system, caches would be present only in RNC and GGSN. In case of a 4G system caches will be present only in eNodeB (basestation) and GGSN (see FIG. 7 for further details). A block 104 discloses this step in FIG. 3.

The intercepted request is matched against a traffic filter. The filter is configured to identify traffic belonging to the node. This could be based on rules related to destination IP address (for example the destination IP address of the server 5 in Internet), port, protocol or URL or a combination of these. A block 105 discloses this step in FIG. 3.

If the intercepted request was found not to correspond to the rules, the traffic that was broken-out by the performed traffic break-out is re-inserted into the upstream tunnel, i.e. re-tunneled for further transport towards Internet. A block 106 discloses this step in FIG. 3.

If instead the intercepted request was found to correspond to the rules, object recognition data including the feature of the captured image is extracted from the payload part of the traffic. A block 107 discloses this step in FIG. 3.

The extracted object recognition data is matched against object recognition data stored in the first cache 2*a* in the RBS 2. A block 108 discloses this step in FIG. 3.

If the match was un-successful, the traffic is re-inserted into the upstream tunnel for further transport towards Internet. The block 106 discloses this step in FIG. 3.

If the match instead was successful i.e. if the object recognition data in the request corresponds to object recognition data in the cache 2*a*, a further match is performed to see whether metadata corresponding to the feature of the captured image exists in the second cache 2*b* in the RBS. A block 109 discloses this step in FIG. 3.

If the further check was un-successful meaning that there is no metadata in the cache corresponding to matched object recognition data the metadata will be looked up in another cache higher up in the hierarchy. The message is then reinserted into the upstream direction to higher level caches. The block 106 discloses this step in FIG. 3.

If the check instead was successful, metadata corresponding to the captured image is fetched from the second cache 2b in the RBS 2. A block 111 discloses this step in FIG. 3.

A reply message is created. If the match was successful, the fetched metadata is inserted in the reply message. The metadata might hereby be personalized. An example is that out of 10 different Ads for the Eiffel tower, just one Ad is selected as being most relevant to the person (i.e. User Equipment 1) interacting with the application. The relevance could be based on for example age group, gender, and occupation etc of the registered owner of the User Equipment 1. This selection procedure is for example handled by the processor 3c taking the user's profile into account. User profile is aggregate information from e.g. a Home Location Register (type of subscription, types of services, service purchase history, gender, age, address etc) and also end user Internet browsing history. Mobile subscriber user profile is a concept well known to someone skilled in the art. A block 112 discloses this step in FIG. 3.

The reply message is re-tunnelled i.e. broken-in into traffic directed towards the User Equipment 1 by the traffic break-out and classifier function in the RBS. A block 113 discloses this step in FIG. 3.

Figure 4:
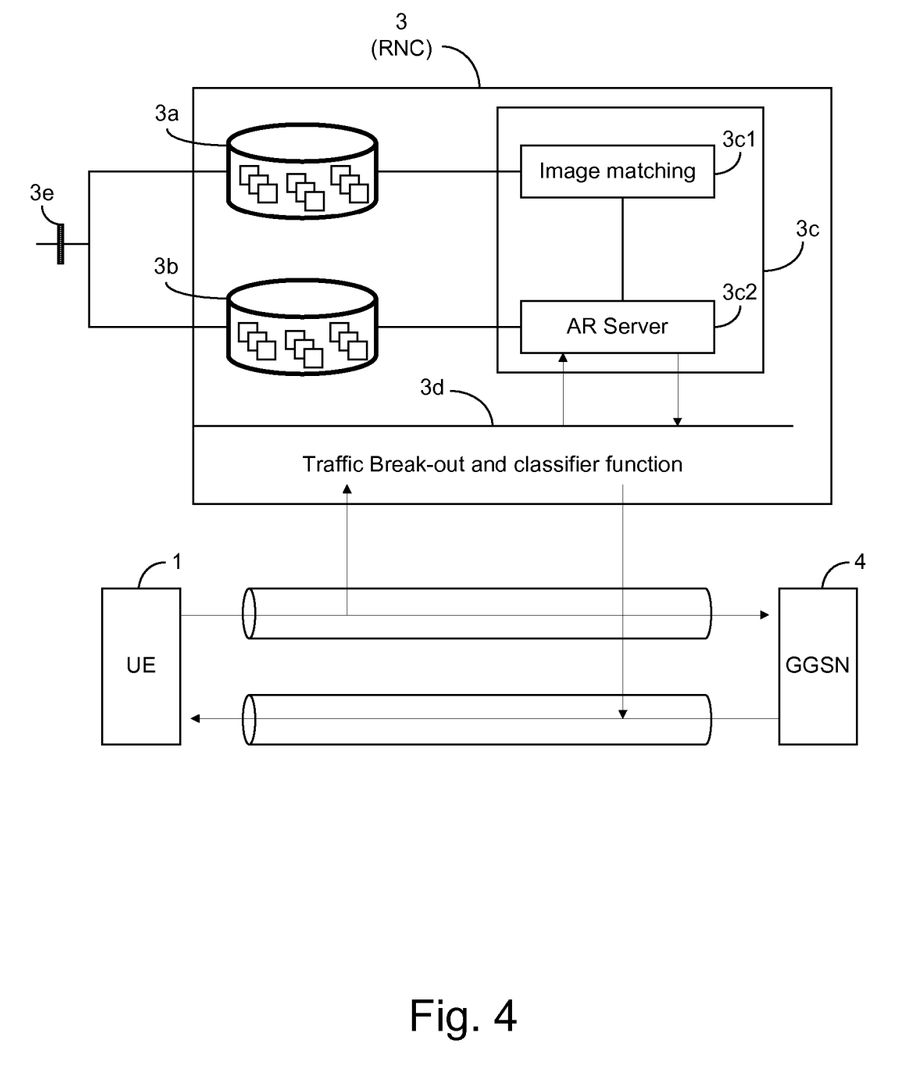
FIG. 4 discloses a block schematic illustration of a Radio Network Controller located on a path between user equipment and a Gateway GPRS Support Node.

FIG. 4 discloses a block schematic illustration of the earlier discussed Radio Network Controller RNC 3 located on the path between the user equipment 1 and the GGSN 4 (see also FIG. 2). To be noted is that entities corresponding to the ones shown in FIG. 4 in the RNC 3 also can be found in the other intermediate nodes, i.e. also other intermediate nodes may have the same kind of qualities as the RNC 3 when it comes to populating caches, intercepting a request and deliver metadata. The Radio Network Controller RNC 3 comprises the first cache 3a populated with object recognition data, in this example images of features (can be seen as square symbols within the cache), the second cache 3b populated with metadata, and the processor unit 3c. The processor unit 3c comprises an Image matching engine 3c1 and an Augmented Reality AR Server 3c2. The AR Server 3c2 is mainly responsible for receiving an intercepted traffic message, parsing the message and extract a feature of an image if not already done and passing a feature to 3c1, and further to find corresponding metadata in 3b. The image matching engine 3c1 is mainly responsible for performing an algorithm (see BM look-up in 3a. Up-stream and down-stream tunnels can be seen in FIG. 4 between 1 and 4. The RNC further comprises the earlier mentioned traffic break-out and classifier function 3d that is capable of breaking-out traffic, i.e. intercept traffic that passes the RNC in the up-stream path between the user equipment 1 and the GGSN 4, and check against traffic filter rules. 3d is further capable of breaking-in messages into traffic directed down-stream or up-stream towards 1 or 4. The RNC in FIG. 4 further comprises an interface 3e that is configured to receive data for populating the caches 3a and 3b. To be noted is that the populating of caches in other intermediate nodes (see FIG. 2) is performed by receiving data via an interface that corresponds to the interface 3e in the RNC. The way of populating is similar for an LTE eNodeB, the difference is that in the case of LTE caching, nearby eNodeBs may need to have an overlap of content as the terminals may associate to either node over a short period of time due to signal power fluctuations. As an option a charging system may be connected to the interface 3e and/or to the Augmented Reality AR Server 3c2. Charging could thereby be performed and Charging Data Records CDRs could be generated and sent to an operator for example per every visual search request serviced.

Figure 5:
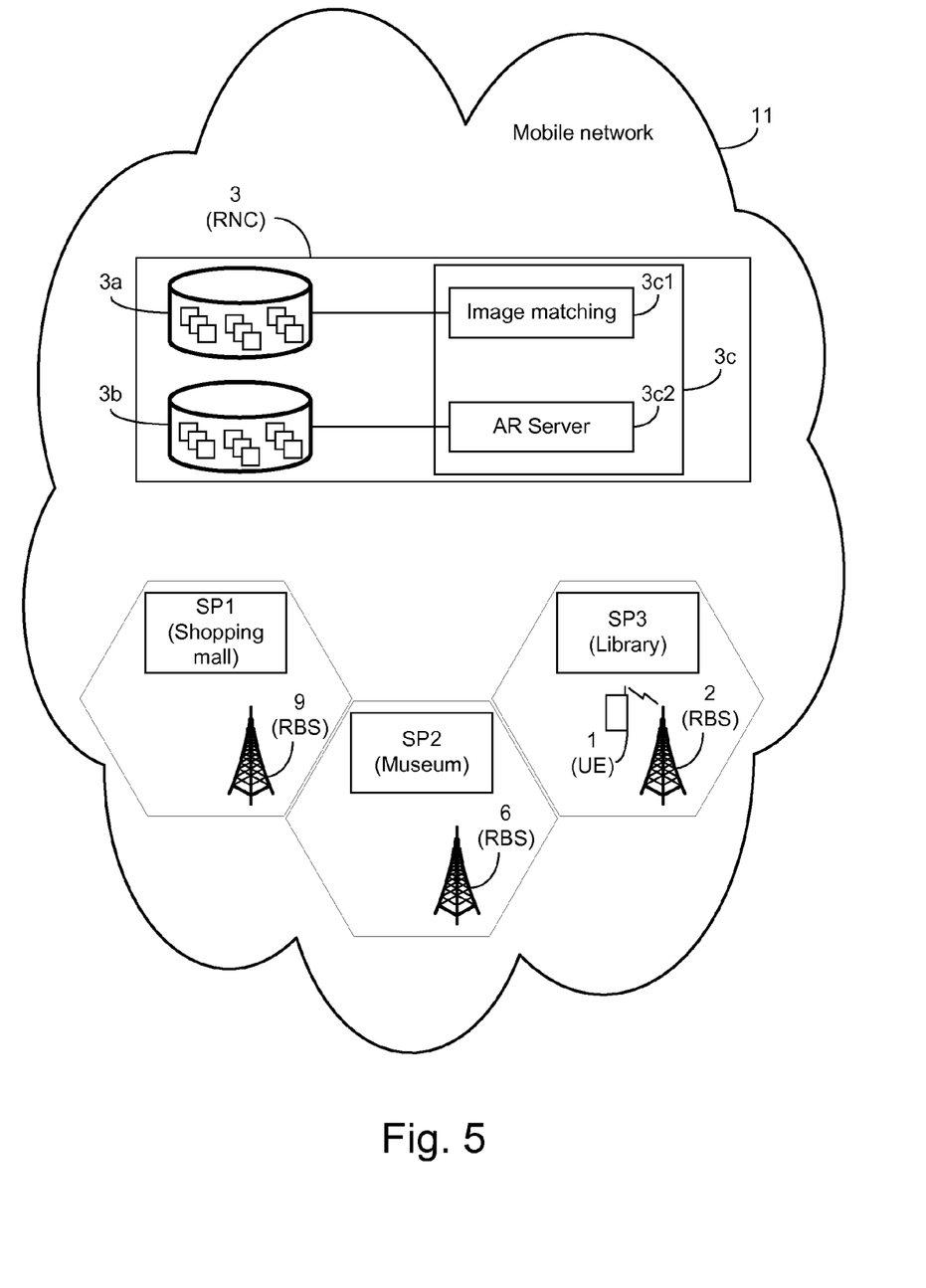
FIG. 5 discloses a block schematic illustration of a Radio Network Controller that is in control of cell areas. Data is cashed in the Radio Network Controller.

FIG. 5 discloses the mobile network 11 earlier shown in FIG. 2. The Radio Network Controller RNC 3 is disclosed in FIG. 5 together with Radio Base Stations RBSs 2,6,9 that are handled by the Radio Network Controller RNC. The RNC 3 comprises the earlier mentioned processor unit 3c. The figure discloses several service providers (SPs) in radio coverage areas adherent to the RBSs 2,6,9 for which the Radio Network Controller RNC 3 act as aggregator. In the example, each one of the Radio Base Stations 2,6,9 is adherent to one Service provider, SP1, SP2 and SP3 respectively. SP3 corresponds in this example to a library; SP2 to a museum and SP1 to a shopping mall. Each Service Provider comprises different real world objects of which photos can be captured by a user of a camera, for example photos of books, museum specimens and groceries of different kinds.

The first cache 3a of images is populated based on the proximity of real-world objects to the operator infrastructure in this example the RNC 3. Real world objects other than the ones mentioned above (books, museum specimens and groceries) are for example buildings in the context of tourist data. The images (or features) of buildings in streets which are covered by a given RNC are candidates for inclusion into the first cache 3a. Below is an example of an algorithm for populating caches:

Identify an RNC.

For a tourist AR/visual search application; identify the streets within the radio coverage of the base stations of the RNC.

Identify the buildings in the streets. Select appropriate building: e.g. the list of buildings could be narrowed down to those that are visible from roads etc. An ID is assigned for each building.

For each of the selected buildings get an image dataset for visual search, this will be used to perform the matching by the image recognition software. Depending on the image recognition software, a feature of the image may be used instead and hence the dataset will be a feature dataset.

For each of the selected buildings get the metadata, this is the additional data which will be returned to the end user if the image recognition was successful.

Populate the RNC cache with both the image/feature dataset and the metadata. The image/feature dataset will be cached in 3a and Metadata will be cached in 3b. As the GGSN (see FIG. 2) act as aggregator to the RNC 3, the image feature dataset and the belonging metadata will be transferred from the GGSN to the RNC and from there potentially further down to selected RBSs. The data in the caches are to be viewed as a set of objects the popularity of which will change with time. So at first all images and metadata will be in the GGSN (or as an option in the server in Internet). Then users start searching with their terminals and hence a popularity pattern starts to emerge. The very popular image-metadata will be stored in the RBS cache, the not too popular in the RNC cache. The GGSN will always store all the images and metadata available in the system and this is basically the 'long tail' content. However as mentioned above, optionally the internet server can be assumed to be the long tail server.

Perform a refresh of the image/feature data set if new buildings are build or if existing buildings are altered (e.g. due to reconstruction/maintenance)

Perform a refresh of the metadata. This is done to ensure an up-to-date set of data about the real-world objects. Also if advertisements are linked to the metadata, these may need to be changed time to time to reflect current advertisement campaigns.

Figure 6:
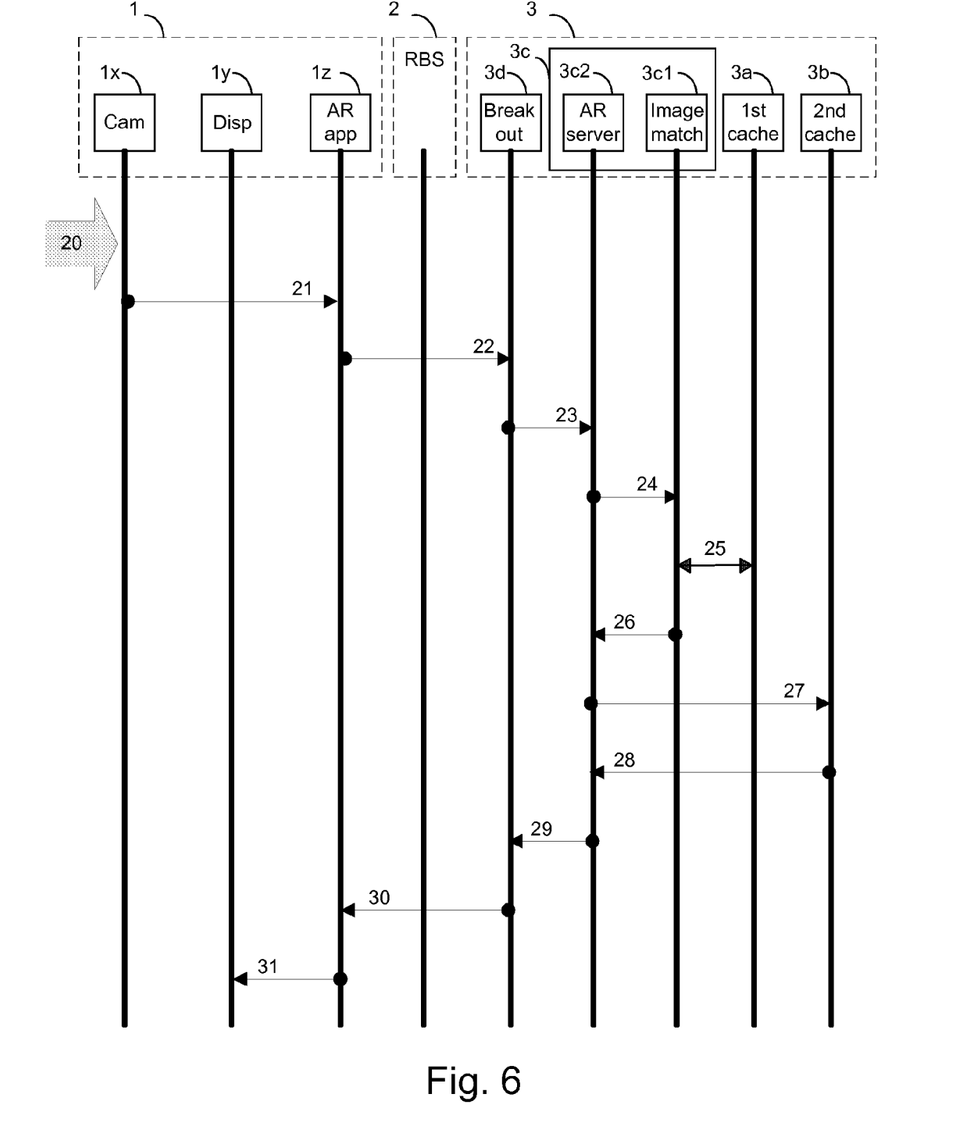
FIG. 6 discloses a signal sequence diagram of a method to intercept a request for metadata and deliver requested metadata.

FIG. 6 discloses a signal sequence diagram according to one embodiment of the invention when a request received to an RNC corresponds to filter rules, a received image matches cached images and corresponding metadata is found. The figure is to be read together with earlier shown figures. The signalling points 2 (RBS), 3 (RNC), 3*a* (1st cache), 3*b* (2nd cache), 3*c* (processor unit), 3*c*1 (Image match), 3*c*2 (AR server) and 3*d* (Break out) have all been discussed earlier in this application. The signalling point 1 (User Equipment) comprises a camera 1*x*, a display 1*y* and an Augmented Reality application 1*z*. FIG. 6 will disclose interception of a request, performing a successful matching and deliver requested metadata to a requesting user. A pre-requisite for the method is that the caches 3*a* and 3*b* in the Radio Network Controller 3 have been populated with data. The method comprises the following steps:

An image, in this example of a museum specimen is captured 20 by a user using the camera 1*x* in the mobile terminal 1. The image is captured in the service provider SP2 within the cell area of the Radio Base Station RBS 6 (see FIG. 5).

The image enters 21 the Augmented Reality application 1*z* wherein a feature optionally, in dependence of application version, is extracted (see prior art) from the image. In this example no extraction was performed in 1*z*.

The user of 1 leaves the cell area of RBS 6 and instead enters the cell area of RBS 2. Since no extraction was performed, a request for data, comprising the raw image is sent 22 in traffic from RBS 2 towards the server 5 (see FIG. 1) in the Internet. This could be done by using a HTTP protocol, but other protocols are possible e.g. ftp.

The image in the traffic is at first received, intercepted and filtered by the RBS 2. Since the image was captured within the cell area of RBS 6 no match was found in the cache 2*a* in the RBS 2 and the traffic is re-inserted into the up-stream tunnel for further transport towards Internet (see also FIG. 3).

The image in the traffic is received 22 by the Traffic Break-out and classifier function 3*d* in the RNC 3.

The Break-out function intercepts the traffic by de-encapsulating the traffic and instead of placing it into the up-stream tunnel as in the normal case, the traffic is sent to the filter function that checks if this is an Augmented Reality AR request. The check in this example is based on a rule saying that if the destination IP address of the request is the IP address of the server 5, the request is an AR request i.e. The request in this example is positively matched.

The request is forwarded 23 to the AR server 3*c*2. Since the request comprises the raw image, a feature is extracted from the image. The feature extraction is an option that depends on if the data cached in 2*a* consist of images or features i.e. if feature matching or image matching later will be performed. In this example 3*c*2 consists of features and consequently a feature is extracted.

The extracted feature of the image is forwarded 24 to the Image matching engine 3*c*1. As an option, if not done before, the feature extraction can be performed at this stage in 3*c*1.

The feature is matched 25 against features cached in the $1^{st}$ cache 3*a* that is populated with features. This matching goes on until a match is found or it is established that no match exists.

In this example a matching feature is found and the result of the matching is returned 26 to the AR server 3*c*2.

Since the matching result was positive, a request to get corresponding metadata is sent 27 from 3*c*2 to the second cache 3*b*.

In this example metadata corresponding to the request is found, and the found metadata is returned 28 to the AR server 3*c*2.

Found metadata is forwarded 29 to the Traffic Break-out and classifier function 3*d*. The break-out function 3*d* inserts the metadata in a reply message.

The reply message is broken-in by the Traffic Break-out and classifier function 3*d* into traffic directed towards the User Equipment 1 and sent 30 to the Augmented Reality application 1*z* in the User Equipment 1.

The Augmented Reality application 1*z* constructs a message to be displayed to the end user in the User Equipment, for example as overlay of the captured image, and the overlay is sent 31 to the display 1*y* in the User Equipment 1.

Figure 7A:
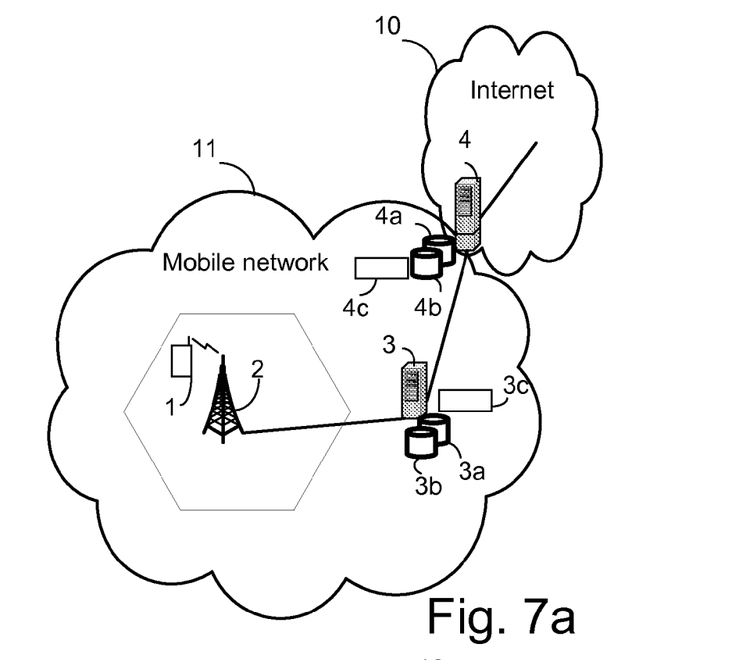
FIG. 7a discloses an illustration of a 3G mobile network.
Figure 7B:
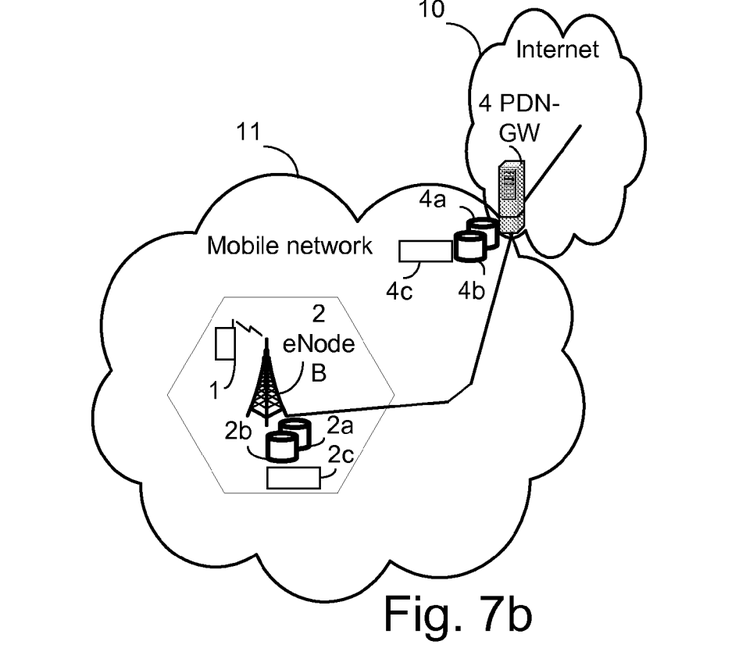
FIG. 7b discloses an illustration of a 4G mobile network.

FIG. 7 discloses examples of mobile systems wherein the invention can be applied. FIG. 7*a* discloses a 3G (High Speed Packet Access HSPA) system wherein the caches are located in the RNC and in the GGSN. For the sake of simplicity the same reference signs for the intermediate nodes RNC and GGSN have been used in FIG. 7*a* as in the earlier shown figures. FIG. 7*b* discloses a 4G (Long Term Evolution LTE) system wherein the caches are located in an eNodeB (has in FIG. 7*b* the same reference sign as the RBS in the previous figures) and in a Packet Data Network PDN Gateway (has in FIG. 7*b* the same reference sign as the GGSN in the previous figures).

System and nodes that can be used to put the invention into practice is schematically shown in the figures. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for performing visual search and augmented reality in a communication system comprising an Internet network attached to a mobile network, the method comprising:
   storing in at least one intermediate node in the mobile network, data related to objects that are geographically related to the at least one intermediate node;
   transmitting a request for metadata from a user equipment in the mobile network towards the Internet network via the at least one intermediate node, which request comprises object recognition data;
   de-tunnelling and intercepting the request in an intermediate node of the at least one intermediate node;
   matching the request against a filter function in the intermediate node and if the matching is successful, further matching the object recognition data in the intercepted request against object recognition data stored in the intermediate node; and
   forwarding metadata to the user equipment if the further matching is successful and existence of metadata is established.

2. The method for performing visual search and augmented reality according to claim 1, comprising:
   matching successfully, the request against a filter function in the intermediate node.

3. The method for performing visual search and augmented reality according to claim 2, comprising:
   as a result of the successful matching, further matching successfully, the object recognition data in the intercepted request against object recognition data stored in the intermediate node.

4. The method for performing visual search and augmented reality according to claim 3, comprising:
   as a result of the successful further matching, establishing existence of metadata corresponding to the object; and
   re-tunnelling and forwarding the existing metadata from the intermediate node to the user equipment.

5. The method for performing visual search and augmented reality according to claim 4, wherein the metadata is personalized in the intermediate node based on characteristics of the user equipment.

6. The method for performing visual search and augmented reality according to claim 3, comprising:
   as a result of the successful further matching, establish non-existence of metadata corresponding to the object; and
   as a result of the established non-existence of metadata, re-tunnelling and forwarding the request for metadata from the intermediate node towards the Internet Network.

7. The method for performing visual search and augmented reality according to claim 2, comprising:
   as a result of the successful matching, further matching un-successfully, the object recognition data in the intercepted request against object recognition data stored in the intermediate node; and
   as a result of the un-successful further matching, re-tunnelling and forwarding the request for metadata from the intermediate node towards the Internet Network.

8. The method for performing visual search and augmented reality according to claim 1, comprising:
   matching un-successfully, the request against a filter function in the intermediate node; and
   as a result of the un-successful matching, re-tunnelling and forwarding the request for metadata from the intermediate node towards the Internet Network.

9. The method for performing visual search and augmented reality according to claim 1, whereby the storing of data in the at least one intermediate node is performed according to relevance of metadata in relation to the at least one intermediate node and by transferring the data from higher levels to lower levels.

10. The method for performing visual search and augmented reality according to claim 1, whereby charging data record are generated per generated search request and forwarded to an operator.

11. The method for performing visual search and augmented reality according to claim 1, comprising:
    forwarding the request for metadata towards the Internet Network if the matching or the further matching is un-successful or non-existence of metadata is established.

12. A non-transitory computer-readable storage medium having stored therein a computer program loadable into a processor of a communication system, wherein the computer program comprises code adapted to perform a method for performing visual search and augmented reality in a communication system comprising an Internet network attached to a mobile network, the method comprising:
    storing in at least one intermediate node in the mobile network, data related to objects that are geographically related to the at least one intermediate node;
    transmitting a request for metadata from a user equipment in the mobile network towards the Internet network via the at least one intermediate node, which request comprises object recognition data;
    de-tunnelling and intercepting the request in an intermediate node of the at least one intermediate node;
    matching the request against a filter function in the intermediate node and if the matching is successful, further matching the object recognition data in the intercepted request against object recognition data stored in the intermediate node; and
    forwarding metadata to the user equipment if the further matching is successful and existence of metadata is established.

13. A Mobile Network Operator node in a communication system comprising an Internet network attached to a mobile network, the node being configured to perform visual search and augmented reality, the node comprising:
    means for storing data related to objects that are geographically related to the node;
    means for de-tunneling and intercepting a received request for metadata, which request comprises object recognition data;
    means for matching the intercepted request against the stored data;
    means for extracting stored metadata from a storage in the node, which extracted metadata corresponds to requested data; and
    means for re-tunnelling and forwarding the extracted metadata towards a user equipment, wherein the node is an intermediate node in the mobile network.

14. The Mobile Network Operator node according to claim 13, the node further comprising:
   means for re-tunnelling and forwarding the request towards the Internet network.

\* \* \* \* \*

UNITED STATES PATENT AND TRADEMARK OFFICE
CERTIFICATE OF CORRECTION

PATENT NO. : 9,489,773 B2
APPLICATION NO. : 14/127653
DATED : November 8, 2016
INVENTOR(S) : Ayodele Damola It is certified that error appears in the above-identified patent and that said Letters Patent is hereby corrected as shown below:

In the Specification

In Column 3, Line 17, delete "Quality of Services QoE" and insert -- Quality of Services QoS --, therefor.

In Column 3, Line 66, delete "exemplified is" and insert -- exemplified embodiment is --, therefor.

In Column 4, Line 39, delete "cashed" and insert -- cached --, therefor.

In Column 7, Line 47, delete "BM" and insert -- BACKGROUND) --, therefor.

In Column 8, Line 49, delete "GGSN (see FIG. 2)" and insert -- GGSN 4 (see FIG. 2) --, therefor.

In Column 8, Line 56, delete "server in" and insert -- server 5 in --, therefor.

In Column 10, Line 47, delete "(magnetic," and insert -- magnetic, --, therefor.

Signed and Sealed this
Fourth Day of February, 2020

Andrei Iancu
*Director of the United States Patent and Trademark Office*